United States Patent
Snyder

[19]

[11] Patent Number: 6,139,223
[45] Date of Patent: Oct. 31, 2000

[54] TRENCH FILLER

[76] Inventor: Robert Wayne Snyder, 1549 Center Church Rd., Lexington, N.C. 27295

[21] Appl. No.: 09/196,802

[22] Filed: Nov. 20, 1998

[51] Int. Cl.[7] .................................................. F16L 1/028
[52] U.S. Cl. ........................... 405/179; 37/142.5; 37/466; 404/92; 404/98; 172/509; 405/154; 405/174
[58] Field of Search ..................... 405/179, 154, 405/158; 172/509, 508, 81, 716; 404/96–98; 37/142.5, 405, 466

[56] References Cited

U.S. PATENT DOCUMENTS

| | | | |
|---|---|---|---|
| 975,457 | 11/1910 | Ransome . | |
| 1,312,852 | 8/1919 | Kjölstad . | |
| 1,384,617 | 7/1921 | Lee . | |
| 1,840,230 | 1/1932 | Harris | 172/509 X |
| 2,814,387 | 11/1957 | McWilliams | 37/142.5 X |
| 3,157,139 | 11/1964 | Spindler . | |
| 3,471,953 | 10/1969 | Wyatt | 37/142.5 |
| 3,568,453 | 3/1971 | Ziegenmeyer | 405/115 X |
| 3,797,582 | 3/1974 | Couch | 172/451 |
| 4,283,867 | 8/1981 | Brown | 37/142.5 |
| 4,539,765 | 9/1985 | Reece | 37/142.5 |
| 4,618,004 | 10/1986 | Howard | 172/176 |
| 5,097,610 | 3/1992 | Bishop | 405/179 X |
| 5,659,983 | 8/1997 | Coutarel et al. | 37/142.5 |
| 5,846,026 | 12/1998 | Gilbert et al. | 405/179 |
| 5,865,563 | 2/1999 | Bonds | 404/72 |

OTHER PUBLICATIONS

Palm Attachments Website printout; Trench–Pak, revised Apr. 15, 1998.

*Primary Examiner*—Dennis L. Taylor
*Attorney, Agent, or Firm*—Rhodes & Mason, P.L.L.C.

[57] ABSTRACT

A trench filler having a generally synclinal front section having a solid top and generally downwardly extending sidewalls, a rear section of unitary construction with the front section, the rear section having a solid top and generally downwardly extending sidewalls that are generally longitudinally parallel to each other, and integral running skids beneath the sidewalls that extend forwardly beyond the front section and having upwardly curled ends wherein dirt located beside a trench is gathered by the front section and released through the rear section back into the trench without substantially disturbing the turf located about the trench.

14 Claims, 3 Drawing Sheets

TRENCH FILLER

FIELD OF THE INVENTION

The present invention relates generally to equipment for landscaping, irrigation, plumbing and electrical services and more specifically to equipment for filling trenches.

BACKGROUND OF THE INVENTION

Trenches are required in landscaping and yard maintenance to for example lay irrigation piping. Also, trenches often are necessary to install drainage systems or outdoor lighting. Ordinarily, digging a trench leaves the excavated earth on either one or both sides of the trench. Once the irrigation piping is laid, the trench must be backfilled with the excavated dirt.

Heretofore, backfilling has been accomplished through several different methods, each with respective drawbacks. Backfilling by hand is time and labor intensive and therefore not efficient or cost-effective. Using a scraper blade to sweep the excavated dirt back into the trench is another method but is difficult to control and often tears up too much turf on either side of the trench. Sweeping by blade also allows for large clumps of dirt to pass over the blade and therefore remain on the lawn rather than being returned to the trench. Another previous solution to backfilling is to use a leveler. Levelers generally spread too much dirt over the grass and turf and therefore increase overall cost and effort because of subsequent obligatory re-seeding. Additionally, simply re-depositing excavated dirt back into the trench likely produces the undesirable result of the dirt settling at a level below ground level.

There is a need, therefore, for equipment to backfill effectively a trench that minimizes further destruction of the turf on either side of the trench. To be effective, there is a need for equipment that backfills the excavated dirt without leaving unacceptable amounts of dirt left on the grass. Further, effective backfilling produces a raised mound that may be tamped to avoid settling of the backfill below ground level.

SUMMARY OF THE INVENTION

The trench filler of the present invention uses a generally synclinal front section having a solid top and generally downwardly extending sidewalls with a rear section of unitary construction. The rear section also can have a solid top and generally downwardly extending sidewalls that are generally longitudinally parallel to each other. Integral running skids can run beneath the sidewalls and extend forwardly beyond the front section and rearwardly behind the rear section. The running skids have upwardly curled ends so that the trench filler runs smoothly over and does not substantially disturb the turf on either side of the trench. By moving the trench filler of the present invention longitudinally along a trench, substantially all of the dirt located beside a trench is gathered by the front section and released through the rear section back into the trench without substantially disturbing the turf located about the trench.

DETAILED DESCRIPTION OF THE PREFERRED EMBODIMENT

Figure 1:
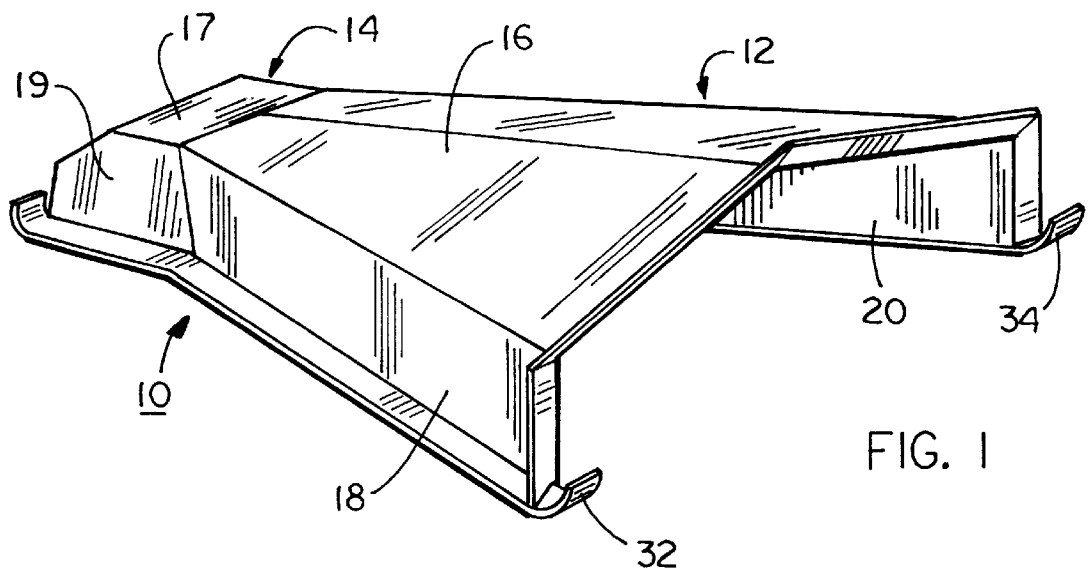
FIG. 1 is a front perspective view of one embodiment of the present invention.

FIG. 1 illustrates one embodiment of the present invention shown generally at 10. As seen in FIG. 1, the trench filler 10 has a front section 12 and a rear section 14. The front 12 and rear 14 sections preferably are formed of unitary construction. Preferably, for aesthetic and performance reasons the trench filler 10 is formed of one-piece steel bent to the preferred shape. The trench filler 10, however, may be formed of separate parts of any suitable material joined together through appropriate means.

Figure 2:
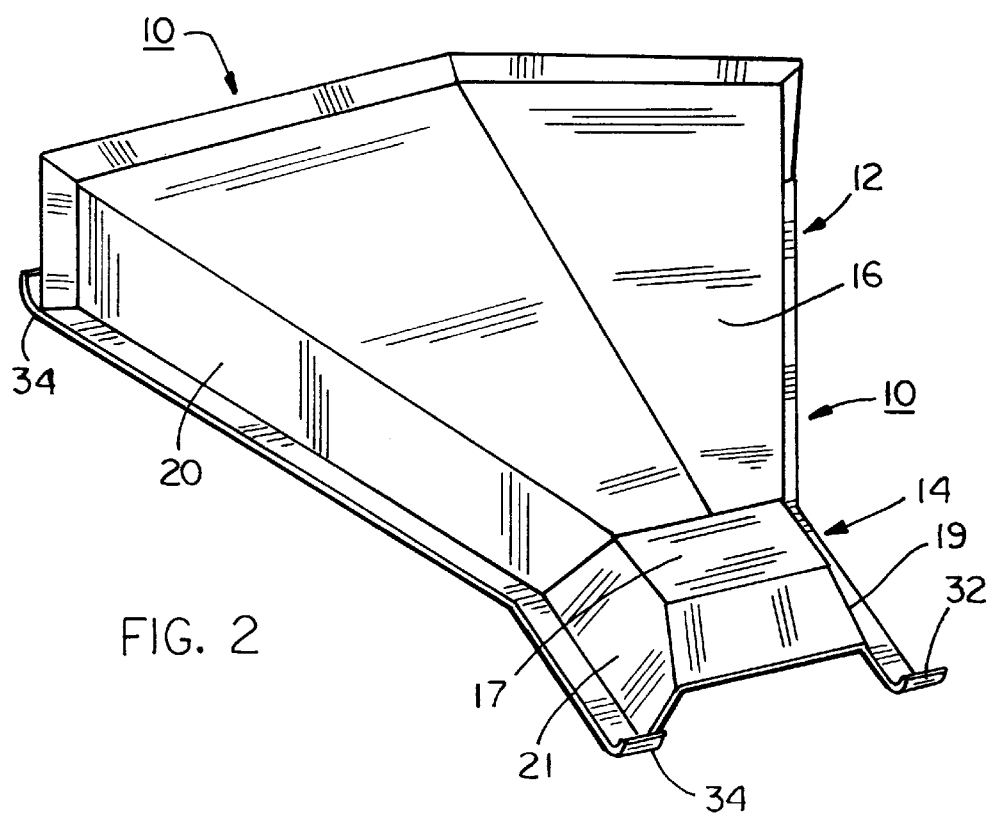
FIG. 2 is a rear perspective view of one embodiment of the present invention.
Figure 3:
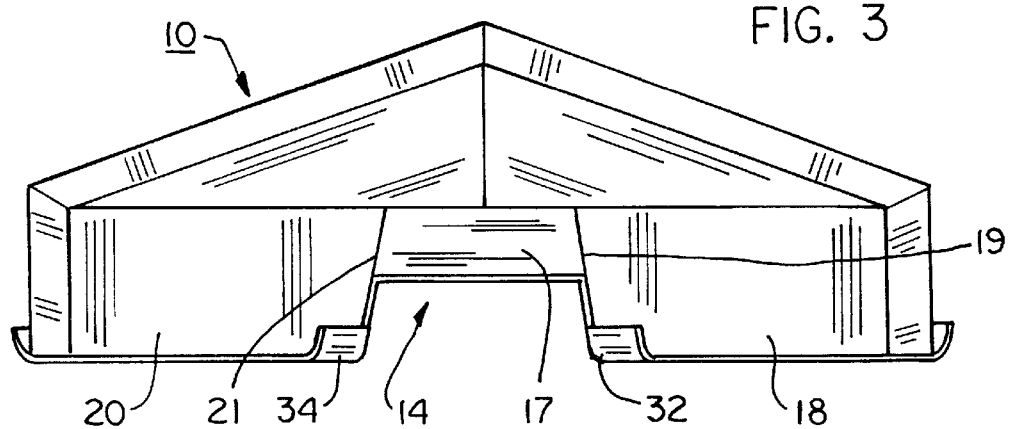
FIG. 3 is a rear elevational view of one embodiment of the present invention.

The front 12 and rear 14 sections each have a respective top section 16, 17. Top sections 16, 17 preferably are solid to prevent dirt from escaping out of the trench filler and to deflect substantially all excavated dirt back into the trench. Preferably, the front section top 16 is formed to outwardly downwardly slope from the longitudinal center of the trench filler 10. The inverted V-shape facilitates dirt deflection back into the trench. Also preferably, the rear section top 17 is formed to downwardly rearwardly slope, as best shown in FIGS. 2 and 3. This slope is formed to further facilitate effective relocation of the excavated dirt back into the trench.

Figure 4:
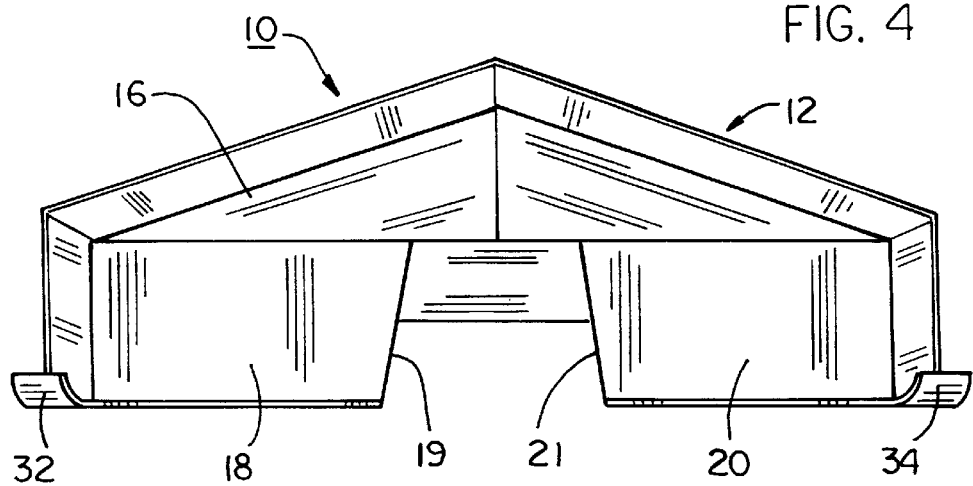
FIG. 4 is a front elevational view of one embodiment of the present invention.
Figure 5:
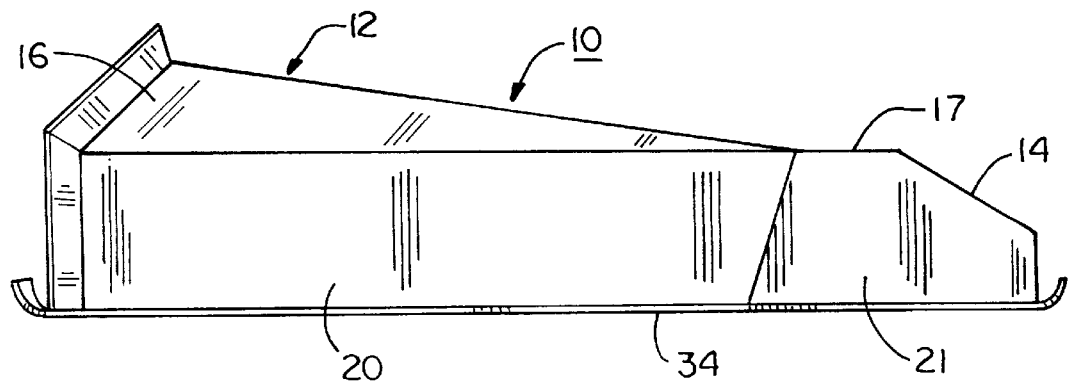
FIG. 5 is a side elevational view of one embodiment of the present invention; the opposite side elevational view being the mirror image.

Additionally, the trench filler has sidewalls 18, 19, 20, 21. The sidewalls 18, 19, 20, 21 are solid and, as shown in FIG. 5, are also preferably formed of one-piece construction with the top sections 16, 17 to prevent escape of any excavated dirt. As best shown in FIG. 4, the front section sidewalls 18, 20 generally are synclinal, sloping inward from a larger mouth toward the rear section. Upon extending into the rear section, the rear section sidewalls 19, 21 are generally longitudinally parallel with each other. The preferred distance between the rear sidewalls 19, 21 is substantially equivalent to the width of the trench to be backfilled. The trench filler 10 may be formed to accommodate different size trenches. Based upon the specified width of any trench digging apparatus, trench filler 10 of the present invention may be formed accordingly.

As shown in FIG. 3, preferably, rear section sidewalls 19, 21 are formed to slope downwardly and outwardly. Hence, as excavated dirt is deposited through the rear section 14, the deposited dirt is left in a generally trapezoidal formation with dirt pilled higher and concentrated in the center portions of the trench. Thereafter, the backfilled dirt may be more efficiently tamped with substantially no overflow of dirt back on to the turf surface due to the dirt concentration in the center of the trench.

As shown particularly in FIGS. 1, 2 and 5, trench filler also has running skids 32, 34. Running skids 32, 34 are formed generally perpendicularly to and beneath the sidewalls 18, 19, 20, 21. Running skids 32, 34 extend beyond the front 18, 20 and rear 19, 21 sidewalls and are formed with upwardly curled ends to avoid damaging turf Running skids 32, 34 are formed of sufficient width to facilitate movement of the trench filler 10 along the turf but do not sufficiently impede the trench filling function by hanging over the trench opening.

Figure 6:
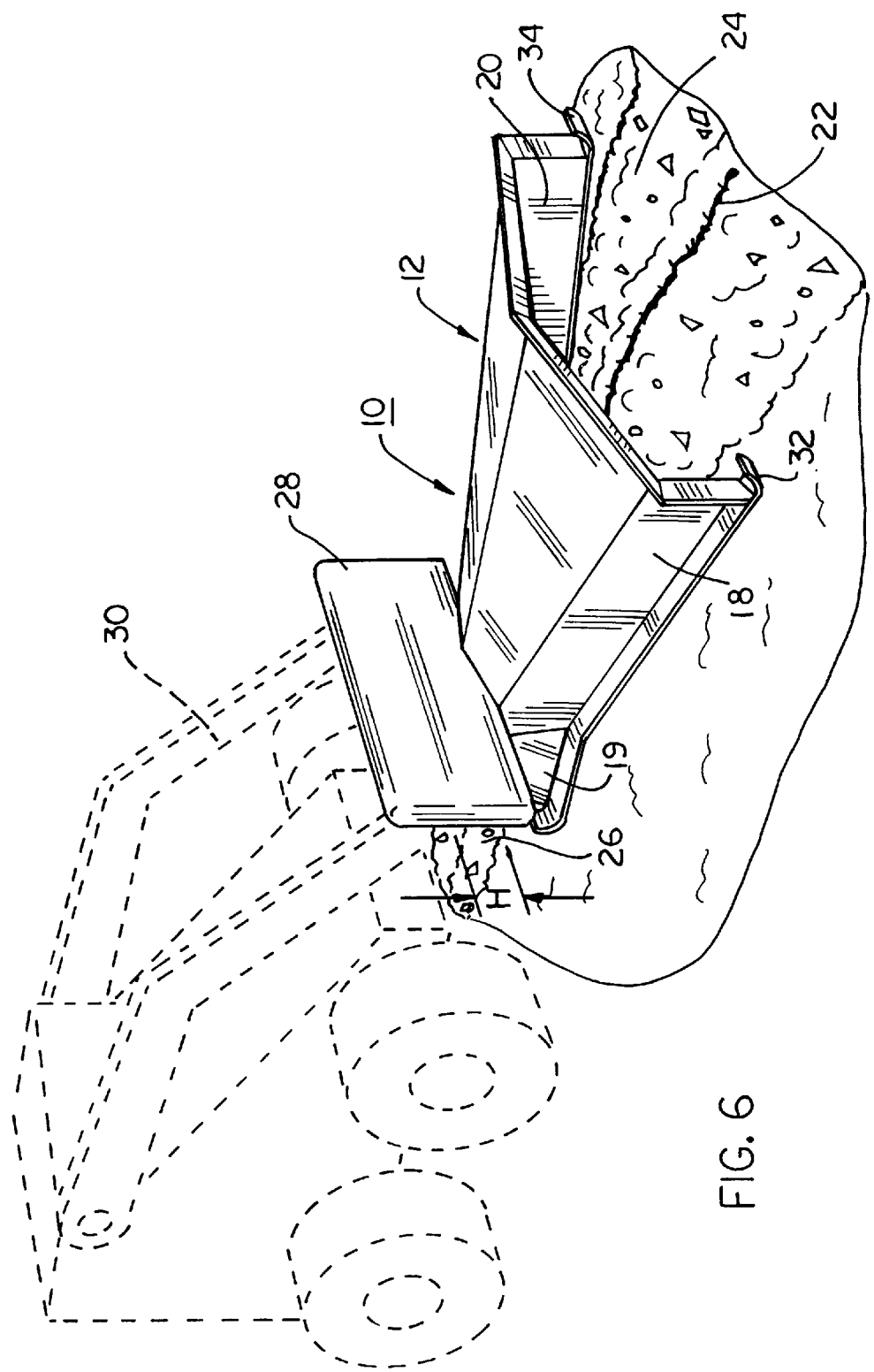
FIG. 6 is a perspective view of one embodiment of the present invention showing longitudinal motion along a trench; the broken lines showing is for illustration only and forms no part of the claimed invention.

In use, as shown in FIG. 6, the trench filler 10 moves forwardly longitudinally along a trench 22 that has excavated dirt 24 on either or both sides of the trench 22. Trench filler 10 collects the excavated dirt 24 with the synclinal shaped front section 12. The excavated dirt 24 passes into the rear section 14 and is deposited back into the trench as backfilled dirt 26.

As seen in FIG. 6, trench filler 10 may be formed with any suitable support 28 for attachment of trench filler 10 to a motorized utility vehicle 30. Preferably, the trench filler 10 is engaged in a forward position to vehicle 30 for increased control, but trench filler 10 may also be trailed behind vehicle 30 if preferred. The preferred support 28 for attachment to trench filler 10 is dependent upon the motorized vehicle, as well as the size of the trench to be backfilled.

One preferred embodiment for the trench filler involves use of trench filler 10 in conjunction with the Dingo® compact utility loader available from Toro®, Bloomington, Minn., the specifications of which are outlined in the Toro® Sitework® Systems brochure, the disclosure of which is herein incorporated by reference.

Again with reference to FIG. 6, the trench filler 10 of the present invention may be fitted with support 28 and attached to a utility loader. The trench filler 10 is then passed over the trench 22. The trench filler 10 gathers the excavated dirt 24 and backfills the dirt 24 back into the trench 22. The backfilled dirt 26 extends longitudinally the length of the trench and is of generally trapezoidal cross-section. The backfilled dirt 26, further, is deposited above the plane of the turf at a height H. Any effective tamping method may be used, for example, a wheel of utility loader 30 may be run over the backfilled trench. By leaving the backfilled dirt 26 in a raised position above the turf and tamping afterward, the trench filler 10 prevents the settling of the backfilled dirt to an unacceptable level below ground level.

Although specific embodiments of the present invention have been illustrated and described in detail, it is to be expressly understood that the invention is not limited thereto. The above detailed description of the embodiment is provided for example only and should not be construed as constituting any limitation of the invention. Modifications will be obvious to those skilled in the art, and all modifications that do not depart from the spirit of the invention are intended to be included within the scope of the appended claims.

I claim:

1. A trench filler comprising:

a generally synclinal front section for gathering dirt located beside a trench, the front section having a top and generally downwardly extending sidewalls; and a rear section for releasing the gathered dirt into the trench, the rear section being of unitary construction with the front section and having a top and generally downwardly extending sidewalls that are generally longitudinally parallel to each other.

2. The trench filler of claim 1 wherein each of the front and rear section tops are solid.

3. The trench filler of claim 1 further comprising:

integral running skids beneath the sidewalls that extend forwardly beyond the front section and having upwardly curled ends wherein the skids prevent substantially disturbing turf located about the trench.

4. The trench filler of claim 1 further comprising:

a support formed on the top of the trench filler for attaching the trench filler to a motorized utility vehicle.

5. The trench filler of claim 4 wherein the support is a solid plate having a lip cornice to facilitate engagement to a motorized utility vehicle.

6. The trench filler of claim 1 wherein the top of the front section slopes outwardly downwardly from the longitudinal center.

7. The trench filler of claim 1 wherein the top of the rear section slopes downwardly rearwardly.

8. The trench filler of claim 1 wherein the sidewalls of the rear section slope downwardly outwardly.

9. The trench filler of claim 1 wherein the sidewalls of the rear section are distanced at a width substantially equivalent to the width of the trench.

10. A method for backfilling trenches comprising:

gathering dirt located along the trench with a generally synclinal forward member;

collecting dirt from the generally synclinal member within a generally rectangular rearward member;

depositing dirt from the generally rectangular rearward member back into the trench; and leaving dirt raised above a ground level wherein the dirt is substantially within the longitudinal margins of the trench.

11. The method of claim 10 wherein the generally rectangular member has breadth dimensions substantially equivalent to the trench.

12. The method of claim 10 further comprising:

tamping the dirt after it has been deposited within the trench.

13. The method of claim 10 further comprising:

moving the generally synclinal and rectangular members through use of a motorized utility vehicle.

14. A trench filler comprising:

a generally synclinal front section having a solid top that slopes outwardly downwardly from a longitudinal center and generally downwardly extending sidewalls;

a rear section of unitary construction with the front section, the rear section having a solid top that slopes downwardly rearwardly and outwardly downwardly extending sidewalls that are generally longitudinally parallel to each other and that are distanced at a width substantially equivalent to the width of the trench;

integral running skids beneath the sidewalls that extend forwardly beyond the front section and having upwardly curled ends;

a support formed on the top of the trench filler for attaching the trench filler to a motorized utility vehicle the support having a lip cornice to facilitate engagement with the motorized vehicle, wherein dirt located beside a trench is gathered by the front section and released through the rear section back into the trench without substantially disturbing turf located about the trench.

* * * * *